Figure 1:
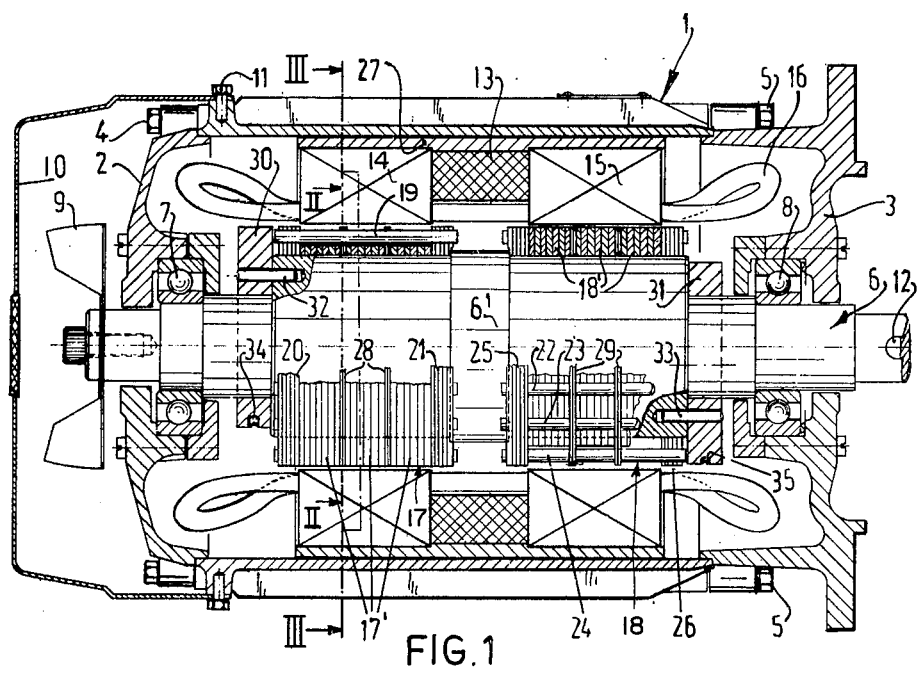

United States Patent [19]
Schiethart

[11] 4,082,973
[45] Apr. 4, 1978

[54] SYNCHRONOUS ELECTRIC MOTOR

[75] Inventor: Lodewijk Schiethart, Dordrecht, Netherlands

[73] Assignee: Heemaf B.V., Hengelo, Netherlands

[21] Appl. No.: 676,515

[22] Filed: Apr. 13, 1976

[30] Foreign Application Priority Data

Apr. 29, 1975 Netherlands .......................... 7505113
Apr. 29, 1975 Netherlands .......................... 7505114
Apr. 29, 1975 Netherlands .......................... 7505115

[51] Int. Cl.² ............................................ H02K 19/00
[52] U.S. Cl. ..................................... 310/162; 310/183; 310/211
[58] Field of Search ............... 310/211, 162, 254, 182, 310/183, 201

[56] References Cited

U.S. PATENT DOCUMENTS

| 3,252,027 | 5/1966 | Korihek | 310/201 X |
| 3,614,496 | 10/1971 | Schiethart | 310/211 X |
| 3,694,906 | 10/1972 | Rank et al. | 310/211 X |
| 3,732,448 | 5/1973 | Schiethart | 310/162 |

Primary Examiner—Donovan F. Duggan
Attorney, Agent, or Firm—Snyder, Brown & Ramik

[57] ABSTRACT

This invention relates to a synchronous electric motor comprising a housing accommodating a stator having a.c. windings and a winding for producing a coaxial direct field and a rotor provided with a cage winding, the poles of which being arranged in axial, relatively spaced transverse planes, wherein radially extending connecting elements are arranged in the interpolar space between the cage windings and the rotor, said connecting rings being formed by rings arranged on the rotor shaft and made from non-magnetic material.

8 Claims, 3 Drawing Figures

SYNCHRONOUS ELECTRIC MOTOR

The invention relates to an electric synchronous motor comprising a housing accommodating a stator having a.c. windings and a winding for producing a coaxial direct field and a rotor provided with a cage winding, the poles of which are arranged in axial, relatively spaced transverse planes. Such a motor is known from U.S. Pat. No. 3,732,448.

Motors driven with high speed involve the risk that cage rods may be radially bent outwardly by centrifugal forces. This particularly occurs in the interpolar space, where no means are provided for fixing the rods in place.

The invention provides a solution of this problem by arranging radially directed connecting elements in the interpolar space between the cage windings and the rotor. The connecting elements may be formed by rings arranged on the rotor shaft. The connecting elements are preferably made of non-magnetic material.

In practice mounting of the cage windings gives rise to production-technical difficulties. In order to obviate these difficulties the cage winding is divided in an axial direction, the parts being arranged in planes corresponding with the pole faces.

The choice of the number of stator grooves is determined by the requirements to be satisfied by the motor. However, the number of rotor rods may be chosen freely within given, practical limits.

The invention has furthermore for its object to choose such a number of rotor rods that during asynchronous operation, for example, during the start, when the motor operates as a short-circuit motor, an optimum torque is supplied. The invention proposes to use a number of rotor rods differing by one third from the number of stator grooves. In practice it has been found that with this ratio an optimum torque is obtained.

For reasons of costs it is preferred to use a standardized cast-iron housing for such a motor. This has, however, the disadvantage that the cast-iron housing is poorly magnetisable so that with this choice the magnitude of magnetic field axially transportable from one stator bank to the other is limited. Since the magnitude of the delivered torque is proportional to the square of the magnitude of the field, the use of a cast-iron housing has a detrimental effect also in this respect.

The invention has also for its object to obviate this disadvantage. According to the invention this is achieved by enclosing the stator over at least part of its length in a steel sleeve. This has the advantage that the transfer capacity for the magnetic field is enhanced in the axial direction. Moreover, this step provides the advantage that the stator is integral with the energizing winding and the steel sleeve so that it can be handled as a unit. This facilitates winding, since the sleeve has no troublesome projecting parts.

The invention will now be described by way of example with refernce to the accompanying drawings showing an embodiment of the invention.

Figure 2:
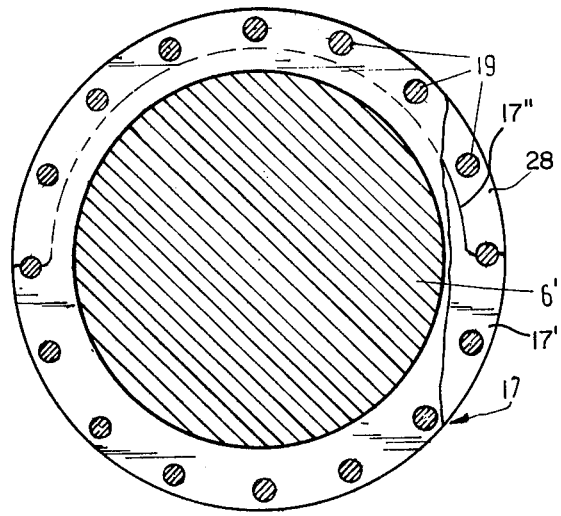
Figure 3:
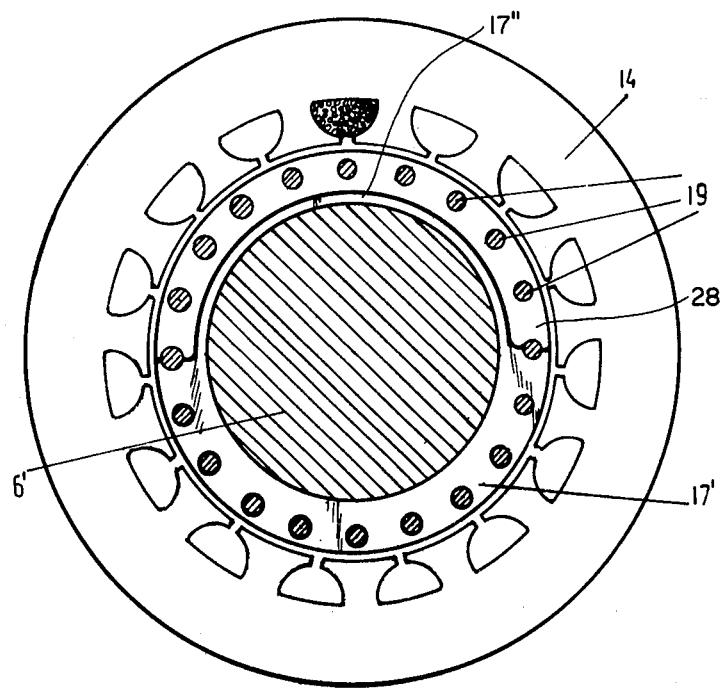

In the drawing is:

FIG. 1 is a longitudinal sectional view of a bipolar motor in accordance with the invention, FIG. 2 is a cross-sectional view and an elevation taken on the line II—II in FIG. 1, and FIG. 3 is a sectional and elevational view taken on the line III—III in FIG. 1.

The motor comprises a substantially cylindrical housing 1 having on either side a shield 2 and 3 respectively. The shields 2 and 3 are connected with the housing 1 by bolts 4 and 5 and have bores for the passage of the rotor shaft 6. Ball bearings 7 and 8 hold the shaft in the shields 2 and 3. The left-hand part of the shaft (see the drawing) has a blade wheel 9 operating as a blower. The blade wheel 9 is screened by a plate 10, which is secured by bolts 11 to the housing 1. The right-hand part of the shaft has a key way 12. The direct current winding 13 energizes the motor. On either side of the winding 13 laminated stator cores 14 and 15 are arranged and provided with the a.c. winding 16. By means of the winding 16 an alternating field is produced.

The two end portions of the shaft 6 are made from non-magnetisable material, whereas the central portion 6' of larger diameter is made from magnetisable material. In two axially spaced planes the central portion 6' is provided with laminated poles 17 and 18 having cages. As may be seen in FIG. 3, each pole lamination 17' is in the form of a ring which is cut away over substantially half its circumference to provide the pole piece portion which is apertured to pass some of the cage rods 19 and projects radially therebeyond, and the narrow portion 17" which is spaced radially inwardly from the remaining cage rods 19. The pole laminations 18' are similarly constructed. The left-hand pole 17 (see the drawing) has a cage formed by a plurality of cage rods 19 evenly distributed along the circumference, one of which is shown in FIG. 1. On either end the cage is bounded by end plates 20 and 21. The right-hand pole 18 is provided with a cage formed by a plurality of cage rods such as those indicated at 22, 23 and 24 in FIG. 1, evenly distributed along the circumference. This cage is bounded at either end by the end plates 25 and 26.

The housing 1 is preferably a standardized housing of cast iron. Since the cast-iron housing is poorly magnetisable this has the disadvantage that the magnetic field axially transferrable from one stator bank to the other is restricted. As a result the torque produced is not at the optimum.

In order to improve said axial transfer of the magnetic field the stator is accommodated in a steel sleeve 27. Thus the stator can be handled as a unit, which has the advantage that more easily than hitherto automatic machines can be used for winding, since fewer projecting parts are found.

Bipolar machines operating with high speed involve the risk that the cage rods which do not pass through the pole lamination 17', 18' may be radially bent outwardly by centrifugal forces. In order to fix the rods in place a plurality of radially extending connecting elements are provided in the form of rings 28 and 29 arranged on the rotor shaft. The rings are preferably made from non-magnetic material.

Since production-technical problems are involved in arranging a single cage on the rotor, a cage winding is provided for each group of radially spaced poles, said cage windings being axially spaced apart.

Since with bipolar machines the weight distribution along the shaft is not uniform so that a kind of crankshaft effect is produced, a wave-like force distribution is produced along the rotor shaft. In order to prevent this phenomenon balancing rings 30 and 31 respectively are provided for each rotor bank and secured eccentrically to the rotor shaft 6. The balancing rings are fixed in place by means of the pins 32 and 33 respectively. The selected eccentricity compensates for the uneven weight distribution. In order to ensure an accurate weight compensation a bore may be made in a radial direction in each balancing ring. For guiding the drill each balancing ring has grooves 34 and 35.

From FIG. 3 it will be apparent that the number of rotor rods exceeds the number of stator grooves by one third of the number of stator grooves. As an alternative the number of rotor rods may be smaller than the number of stator grooves by one third of the latter number. With this ratio an optimum torque is produced during asynchronous operation, for example, during the start, when the motor operates as a short-circuit motor.

What I claim is:

1. In a synchronous motor comprising a housing, a stator within said housing, a.c. winding means associated with said stator for producing a rotating magnetic field, d.c. winding means associated with said stator for producing a stationary magnetic field, a rotor journalled in said housing, a cage winding carried by said rotor and including a plurality of circumferentially spaced rods, and a plurality of pole pieces carried by said cage winding, said pole pieces including portions penetrated by some of said rods and other portions underlying other of said rods whereby said other rods are unsupported between their ends, the improvement which comprises:

connecting means disposed between said pole pieces for supporting said other rods between their ends.

2. In a synchronous motor as defined in claim 1 wherein said connecting means is in the form of rings surrounding said rotor and penetrated by said other rods.

3. In a synchronous motor as defined in claim 2 wherein said rings are formed of non-magnetic material.

4. In a synchronous motor as defined in claim 1 wherein said stator is provided with a series of circumferentially spaced grooves receiving said a.c. winding means, the number of rods differing from the number of stator grooves by one third the number of stator grooves.

5. In a synchronous motor as defined in claim 1 including a steel sleeve enclosing said stator.

6. A synchronous electric motor comprising in combination:

a housing having at least one annular core member disposd therein;

d.c. winding means disposed adjacent said core member for establishing a closed d.c. magnetic field extending axially within said housing and passing radially through said core member;

polyphase winding means extending through said core member and circumferentially of said housing for establishing a rotating magnetic field within said housing;

a rotor journalled in said housing concentrically of said core member and said winding means, said rotor including a shaft, cage winding means fixed to said shaft and including circumferentially spaced electrically conducting cage rods and opposite end plates between which said cage rods extend, and a plurality of pole pieces stacked between said end plates, each of said pole pieces being in the form of a ring which is cut away over part of its circumference to provide a narrow portion passing beneath some of said cage rods and a wide pole portion, said wide pole portion being apertured to pass the other of said cage rods; and at least one connecting element disposed in said stack of pole pieces, said connecting element being in the form of an apertured ring receiving all of said cage rods whereby said connecting element supports said rods which are unsupported where said pole pieces are cut away.

7. A synchronous electric motor as defined in claim 6 including a steel sleeve enclosing said core member.

8. A synchronous electric motor as defined in claim 6 wherein said core member is provided with a number of axial grooves receiving said a.c. winding means, the number of said cage rods differing from said number of grooves by one third of the number of said grooves.

* * * * *